Patented Oct. 29, 1940

2,219,858

UNITED STATES PATENT OFFICE 2,219,858

PYRIMIDINE COMPOUND

Kurt Westphal, Wuppertal-Vohwinkel, Germany, assignor to Winthrop Chemical Company, Inc., New York, N. Y., a corporation of New York No Drawing. Application August 16, 1939, Serial No. 290,489. In Germany March 22, 1937

16 Claims. (Cl. 260—251)

The present invention relates to new pyrimidine compounds, i. e. 2-halogenpyrimidines bearing in the 4-position a tertiary amino group eventually containing further substituents and a process for their manufacture.

When causing 2.4-dihalogenpyrimidine to react with ammonia a mixture of nearly equal parts of 2-amino-4-halogen- and 2-halogen-4-amino-pyrimidine has been obtained. The mixture thus obtained can only difficultly be separated into homogeneous parts (Berichte der Deutschen Chemischen Gesellschaft 32, page 2921 ff.).

Surprisingly it has been found that 2-halogenpyrimidine bearing in the 4-position a tertiary amino group eventually containing further substituents can be obtained in a practically homogeneous form from dihalogenpyrimidine by causing 2.4-dihalogenpyrimidines to react with secondary amines. The secondary amines react on the said pyrimidines in such a manner that practically only the halogen atom in 4-position of the 2.4-dihalogenpyrimidine is substituted by the amino group. Therefore, pure 2-halogenpyrimidines with tertiary amino groups in 4-position may be easily obtained with the aid of secondary amines. Only small quantities of the isomeric 4-halogen compound can be detected in the mother liquor. The reaction is in the easiest way performed at usual temperature, whereby it is generally suitable to cool the reaction mixture. As regards the acid set free during the reaction preferably excess lye or any other suitable acid-binding agent is used.

The 2-halogenpyrimidines containing the tertiary amino group in 4-position are stronger bases than the 4-halogenpyrimidines containing the tertiary amino group in 2-position. In consequence thereof they form stable easily water soluble salts.

The 2-halogenpyrimidines obtained according to the aforesaid process bearing in the 4-position a tertiary amino group and further substituents are valuable starting materials for the manufacture of dyestuffs and pharmaceutical products. They may also be used as such for technical purposes. It has been found that they are particularly well suited for killing rodents.

The following examples illustrate the invention without, however, restricting it thereto:

Example 1

163 gs. of 2.4-dichloro-6-methylpyrimidine are dissolved in 500 ccs. of alcohol. While stirring a solution of 135 gs. of dimethylamine in 500 ccs. of alcohol is added drop by drop within 45 minutes. On cooling, the temperature is kept between 10 and 20° C. Thereupon stirring is continued at this temperature for five hours. The solvent is distilled off under diminished pressure and the oleaginous residue is treated with dilute hydrochloric acid. The undissolved starting material is extracted with ether and the hydrochloric acid solution neutralized with sodium acetate. Thereby plenty of crystals precipitate which are dissolved on the addition of ether. The liquid solution is then extracted with ether for several times. The combined ethereal solutions are neutralized with sodium carbonate and dried. After having removed the ether the remaining residue is melting at 87.5° after recrystallisation from ligroin. The 2-chloro-4-dimethyl-amino-6-methylpyrimidine is obtained in white crystals.

In the mother liquors only small quantities of the 2-dimethylamino-4-chloro-6-methylpyrimidine of the boiling point of 108°/9 mm. can be detected.

When using instead of dimethylamine 2 mols of dibutyl amine the 2-chloro-4-dibutyl amino-6-methylpyrimidine is obtained as a light yellow oil which boils at 162° under 3 mms. pressure.

When using 2 mols of methyl-ethylamine the 2-chloro-4-(methyl-ethylamino)-6-methylpyrimidine is obtained as a colorless oil boiling at 119° under 1.5 mms. pressure.

From 25.2 gs. of 2.4-dibromo-6-methylpyrimidine and 9 gs. of dimethylamine in alcoholic solution the 2-bromo-4-dimethyl-amino-6-methylpyrimidine is obtained in a similar way; after recrystallisation from ligroin it represents white crystals of the melting point of 93°.

Example 2

163 gs. of 2.4-dichloro-6-methylpyrimidine are dissolved in 600 ccs. of alcohol and gradually mixed with 22 gs. of diethylamine. By cooling the temperature of the reaction mixture is kept of 20° C. After 5 hours the alcohol and the excess diethylamine are distilled off under diminished pressure. The residue is worked up as described in Example 1. Thus the 2-chloro-4-diethylamino-6-methylpyrimidine is obtained in form of a low melting crystalline mass. The hydrochloric acid salt is melting at 162° C. after recrystallisation from acetic ester.

Example 3

70.6 gs. of 2.4-dichloro-5.6-dimethylpyrimidine are dissolved in 200 ccs. of alcohol and 36 parts of dimethylamine are added thereto in alcoholic solution within 1 hour. By cooling the temperature is kept at 20° C. Thereupon the alcohol is distilled off under diminished pressure and the crystalline residue is treated with hydrochloric acid. The insoluble parts are extracted with ether. The clear hydrochloric acid solution is then neutralized with sodium acetate. Thereby white crystals of the 2-chloro-4-dimethylamino-5.6-dimethylpyrimidine precipitate which are sucked off and recrystallized from ligroin. They have a melting point of 92.5° C.

Example 4

224 gs. of 2.4-dichloropyrimidine are dissolved in 2 liters of alcohol and gradually mixed with 514 ccs. of a 39.6 per cent dimethylamine solution. The working up is performed as described in the preceding examples. White crystals of the 2-chloro-4-dimethylaminopyrimidine of the melting point of 81° are thus obtained.

Example 5

23.4 gs. of 2.4-dichloro-6-ethylpyrimidine are dissolved in 100 ccs. of alcohol. Thereto an alcoholic solution of 12 gs. of dimethylamine is slowly added. On cooling temporarily the temperature is kept between 25 and 30° C. After 3 hours the solvent is evaporated and the residue worked up as described in Example 1. The 2-chloro-4-dimethylamino-6-ethylpyrimidine is obtained as a white crystalline mass which has a boiling point of 128° under 2 mms. pressure.

Example 6

32.6 gs. of 2.4-dichloro-6-methylpyrimidine are dissolved in 400 ccs. of water and 34 gs. of piperidine added drop by drop while stirring whereby the temperature is raised to 45° C. After half an hour a test portion of the precipitate is clearly soluble in diluted hydrochloric acid. The reaction mixture is then extracted with ether for several times. After drying and distilling off the ether residue an oil remains which boils at 165° C. under 2 mm. pressure. The 2-chloro-4-piperidyl-6-methyl-pyrimidine solidifies in a crystalline form in the condenser.

Example 7

163 gs. of 2.4-dichloro-6-methylpyrimidine are stirred together with 1000 ccs. of a normal soda lye. To this mixture 110 gs. of a 43.5% solution of dimethylamine is dropped within half an hour. The reaction temperature is kept below 50° C. with temporarily cooling. After 1 hour the reaction is finished. The crystals obtained are sucked off and dried. After recrystallisation from ligroin the 2-chloro-4-dimethylamino-6-methyl-pyrimidine is obtained in white needles of the melting point of 87° C.

Example 8

326 gs. of 2.4-dichloro-6-methylpyrimidine are stirred with 100 ccs. of alcohol and 42 gs. of diethanolamine are dropped into the solution while cooling to 20° C. After 2 hours the reaction mixture is evaporated to dryness under diminished pressure; the residue is extracted with diluted hydrochloric acid, whereupon the hydrochloric acid solution is neutralized with sodium acetate. The crystals precipitating thereby are sucked off and recrystallized from water. Thus the 2-chloro-4-diethanolamino-6-methylpyrimidine is obtained in needles melting at 150° C.

I claim:
1. 2-halogenpyrimidines bearing in the 4-position a dialkyl-amino group.
2. 2-halogenpyrimidines bearing in the 4-position a dialkyl-amino group in which the alkyl radicals are of relatively low molecular weight.
3. 2-halogenpyrimidines bearing in the 4-position a dimethyl-amino group.
4. 2-halogenpyrimidines bearing in the 4-position a dialkyl-amino group, the halogen atoms being selected from the group consisting of chlorine and bromine.
5. 2-halogenpyrimidines bearing in the 4-position a dimethyl-amino group, the halogen atoms being selected from the group consisting of chlorine and bromine.
6. 2-halogenpyrimidines bearing in the 4-position a dialkyl-amino group and in the 6-position a lower alkyl radical.
7. 2-halogenpyrimidines bearing in the 4-position a dialkyl-amino group in which the alkyl radicals are of relatively low molecular weight and in the 6-position a lower alkyl radical.
8. 2-halogenpyrimidines bearing in the 4-position a dimethyl-amino group and in the 6-position a methyl radical.
9. 2-halogenpyrimidines bearing in the 4-position a dimethyl-amino group and in the 6-position a methyl radical, the halogen atoms being selected from the group consisting of chlorine and bromine.
10. A compound selected from the group consisting of 2-chloro-4-dimethylamino-6-methyl-pyrimidine and its salts.
11. The process for preparing 2-halogenpyrimidines bearing in the 4-position a tertiary amino group comprising reacting a 2.4-dihalogenpyrimidine with a dialkyl-amine in the presence of a solvent.
12. The process for preparing 2-halogenpyrimidines bearing in the 4-position a tertiary amino group comprising reacting 2.4-dihalogenpyrimidine with a dimethylamine.
13. The process for preparing 2-halogenpyrimidines bearing in the 4-position a tertiary amino group comprising reacting 2.4-dihalogen-6-alkyl-pyrimidine with a dialkyl amine in the presence of a solvent.
14. The process for preparing 2-halogenpyrimidines bearing in the 4-position a tertiary amino group comprising reacting a 2.4-dihalogenpyrimidine, the halogen atoms being selected from the group consisting of chlorine and bromine, with a dialkyl amine in the presence of a solvent.
15. The process for preparing 2-halogenpyrimidines bearing in the 4-position a tertiary amino group comprising reacting a 2.4-dihalogenpyrimidine, the halogen atoms being selected from the group consisting of chlorine and bromine, with dimethylamine in the presence of a solvent.
16. The process for preparing 2-halogenpyrimidines bearing in the 4-position a tertiary amino group comprising reacting a 2.4-dihalogen-6-methyl-pyrimidine, the halogen atoms being selected from the group consisting of chlorine and bromine, with dimethylamine in the presence of a solvent.

KURT WESTPHAL.